Jan. 13, 1953 D. K. ALLISON 2,625,678

RADIANT ENERGY NAVIGATIONAL DEVICE

Filed Aug. 5, 1946 9 Sheets-Sheet 1

DONALD K. ALLISON,
INVENTOR.

BY Robert M. Falwider [signature]
ATTORNEY.

Jan. 13, 1953 D. K. ALLISON 2,625,678

RADIANT ENERGY NAVIGATIONAL DEVICE

Filed Aug. 5, 1946 9 Sheets-Sheet 2

DONALD K. ALLISON,
INVENTOR.

BY Robert M. Falwider

ATTORNEY.

DONALD K. ALLISON,
INVENTOR.

BY Robert W. Fulwider

ATTORNEY.

Jan. 13, 1953 D. K. ALLISON 2,625,678

RADIANT ENERGY NAVIGATIONAL DEVICE

Filed Aug. 5, 1946 9 Sheets-Sheet 4

DONALD K. ALLISON,
INVENTOR.

BY Robert W. Fulwider

ATTORNEY.

DONALD K. ALLISON,
INVENTOR.

BY [signature]

ATTORNEY.

DONALD K. ALLISON,
INVENTOR.

BY Robert M. [signature]

ATTORNEY.

DONALD K. ALLISON,
INVENTOR.

BY Robert M. Fulwider

ATTORNEY.

DONALD K. ALLISON,
INVENTOR.
BY
ATTORNEY.

Jan. 13, 1953 D. K. ALLISON 2,625,678

RADIANT ENERGY NAVIGATIONAL DEVICE

Filed Aug. 5, 1946 9 Sheets-Sheet 9

DONALD K. ALLISON,
INVENTOR.

BY [signature]

ATTORNEY.

Patented Jan. 13, 1953

2,625,678

UNITED STATES PATENT OFFICE 2,625,678

RADIANT ENERGY NAVIGATIONAL DEVICE

Donald K. Allison, Washington, D. C., assignor to General Electric Company, a corporation of New York Application August 5, 1946, Serial No. 688,407

19 Claims. (Cl. 343—11)

My invention relates generally to radiant energy navigational devices and more particularly to such devices which are adapted to be used and installed upon an aircraft to give an indication of the terrain below the craft, of any objects at the same altitude as the craft with which the latter might collide, and of hazardous storms and meteorological conditions.

In the operation of aircraft, it is very desirable and sometimes essential that the pilot know the particular terrain over which he is flying, both from the standpoint of knowing his present location with respect to the complete flight, and also in order that he may maintain a safe altitude above all obstacles with which he might collide. In addition, it is highly desirable that the pilot be able to observe storms, fronts and other meteorological conditions on the flight course. Much time and effort have been spent in the developing of devices to accomplish this; and various systems making use of high frequency radio waves have been developed wherein a transmitter mounted on the aircraft sends out a series of pulses of such waves, and a receiver in the aircraft receives the reflections of these waves during the periods when the transmitter is not operating. Such devices are referred to under the generic term of "radar systems" and have been of tremendous assistance in night operations, or when the terrain is obscured by clouds, smoke, or similar phenomena. In order to determine the direction from which the reflected pulse is received, the transmitted pulse is confined to a relatively narrow beam by means such as a reflector; and the receiver is operated in conjunction with the transmitter so that the former "scans" the same area as the transmitter.

In the majority of radar devices, the same reflector and antenna are used for both the transmitter and receiver, so that positive assurance is had that the areas scanned by the transmitter and receiver at any instant are identical; and by rotating the antenna and reflector, an area much larger than that covered by the beam of the reflector may be scanned. In many aircraft radar installations, such scanning is customarily done in a complete circle so that the location of all objects and their relative position in azimuth may be determined. Such a system is called a "PPI" (Plan Position Indicator) system. However, while a complete circle may be made in azimuth, the use of a relatively narrow beam does not give sufficient indication of objects which may be above or below the beam itself. Consequently, the shape of the beam has been modified so that while the beam is relatively narrow in azimuth, the distribution of energy in the vertical plane has been materially broadened. A fan beam wherein the energy directed vertically downward is relatively small but increases as the angle to the vertical is increased has been developed and used for providing an indication of the terrain over which the craft is flying. Such a fan beam is known as a "cosecant-squared" beam while the relatively narrow beam first referred to is generally known as a "pencil" beam. The energy distribution in the cosecant-squared beam in a vertical plane is such that, within the effective range of the system, equally reflective targets send back equal strength echoes, regardless of their distance.

To give a visual indication to the pilot or navigator of the terrain over which he is flying, the output of the receiver is customarily applied to a cathode ray tube which is arranged to provide an azimuthal sweep of a radial range line corresponding to the direction of the beam at that particular instant. As the radial line or trace rotates, reflected pulses locally intensify the range line causing bright spots to appear on the screen of the tube, indicating the presence of an object in that particular direction in azimuth and at a distance measured by the time required for the pulse to travel from the aircraft, to the object, and back to the receiver. By using a cathode ray tube whose screen is formed of a material on which an image persists for a relatively long length of time, a complete representation of the terrain may be obtained by sweeping the beam throughout 360 degrees in azimuth. However, such a system gives no indication as to the relative elevation of the various objects indicated thereon, but indicates only their position in azimuth and distance from the aircraft. It is thus impossible to determine whether the aircraft is at the same elevation as a mountain indicated on the screen, or whether sufficient clearance is provided for safe flying. Furthermore, other aircraft may appear on the screen without any indication as to whether a collision is likely or adequate altitude clearance is provided. In addition, while storms and weather fronts may be indicated by certain radar equipment, the energy distribution in a cosecant-squared beam is such as to provide no indication of such meteorological conditions. The pencil beam, however, will indicate them.

It is therefore a major object of my invention to provide a radiant energy navigational device for aircraft which indicates the terrain over which the aircraft is flying, and which also indicates with special clarity any objects at the same elevation as the aircraft.

Another object of my invention is to provide such a device in which both the terrain indicator and the collision indicator make use of the same equipment so that duplication of parts and functions is avoided.

It is a further object of my invention to provide such a device wherein the objects with which the aircraft might collide are indicated on the same screen which carries the indication of the terrain so that the relative positions of these objects may be readily observed.

It is a further object of my invention to provide an improved navigational device of this type which also permits unfavorable weather conditions such as storms to be observed and avoided.

A still further object of the invention is to provide an improved navigational device for an aircraft which is gyro-stabilized so as to maintain a true vertical position despite rolling and pitching of the aircraft.

Still another object of my invention is to provide an improved, light-weight, gyro-stabilized navigational device, which includes radar transmitting, radiating, and receiving elements in a unitary assembly and which is particularly adapted for use on aircraft.

It is still another object of the invention to provide a navigational device of this character which is compact, which adds a minimum of weight and drag to an aircraft, and which uses equipment whose operation is readily understandable by technicians now trained in the installation and servicing of radar equipment now installed on aircraft.

Yet another object of my invention is to provide an improved, lightweight, radar navigation system comprising a gyro-stabilized assembly having certain elements of the radar system inclosed in a protective housing and pressurized.

These and other objects and advantages of my invention will become apparent from the following description of preferred and modified forms thereof, and from the drawings illustrating those forms in which.

Figures 3, 3A:
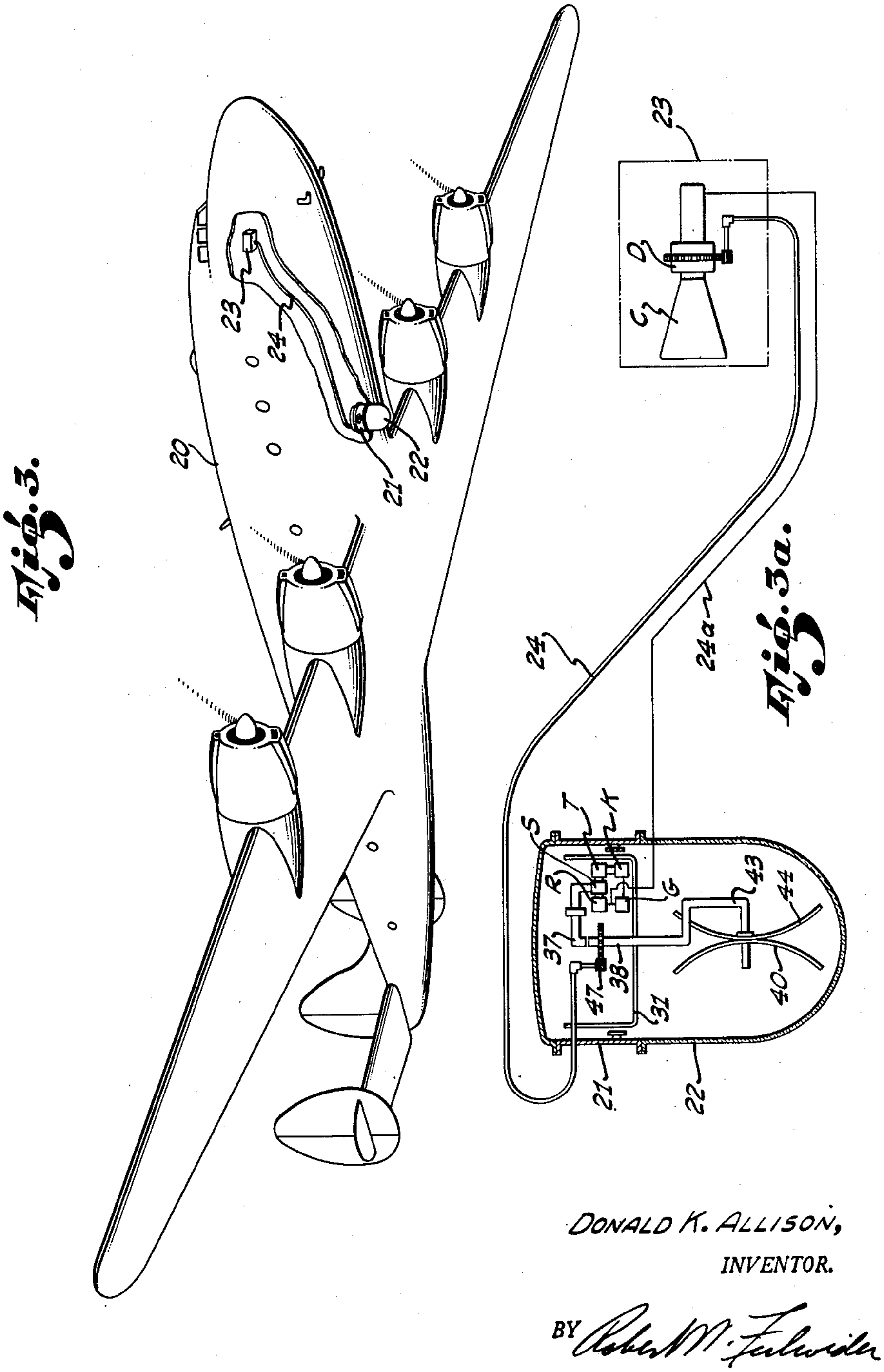
Fig. 3 is a perspective view of an aircraft having my improved navigational device installed therein, and indicating the relative location of the various components.
Figure 4:
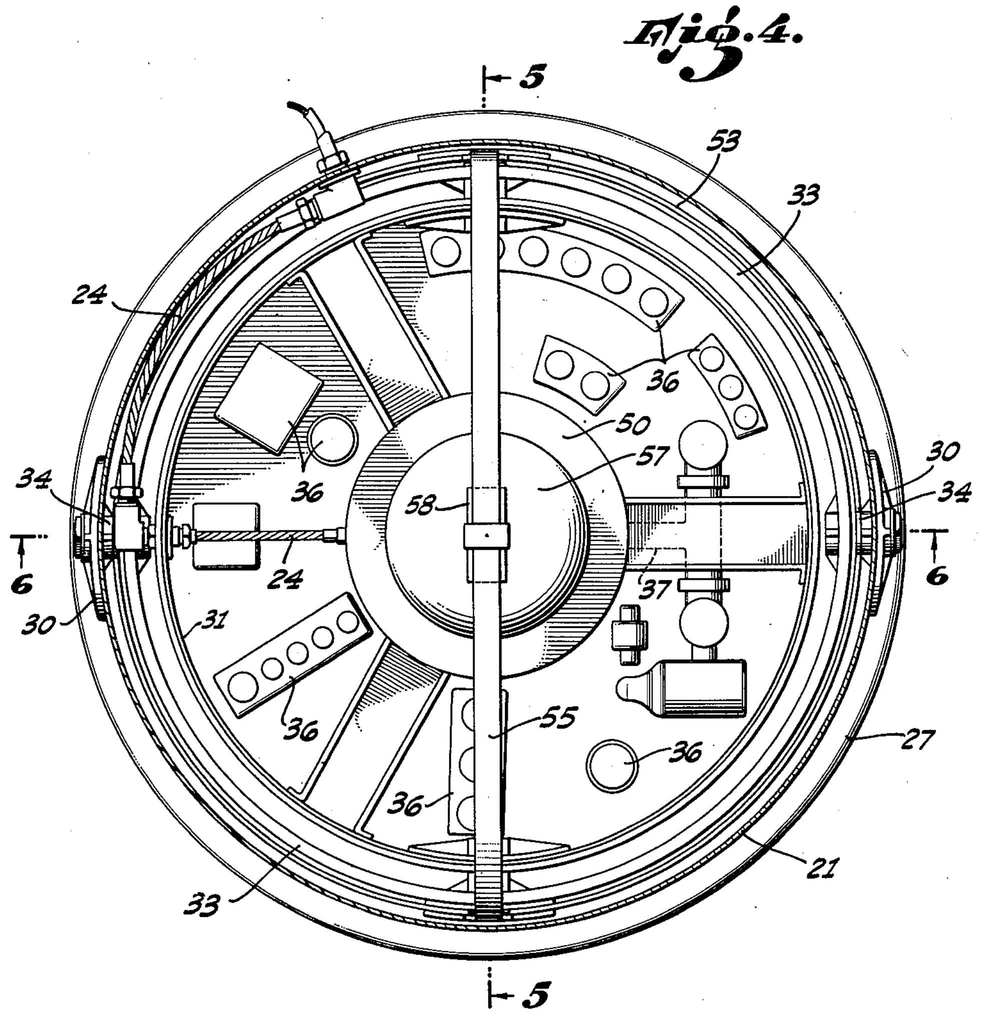
Figure 7:
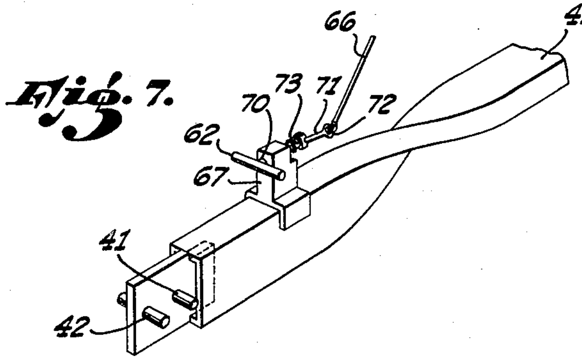
Figure 5:
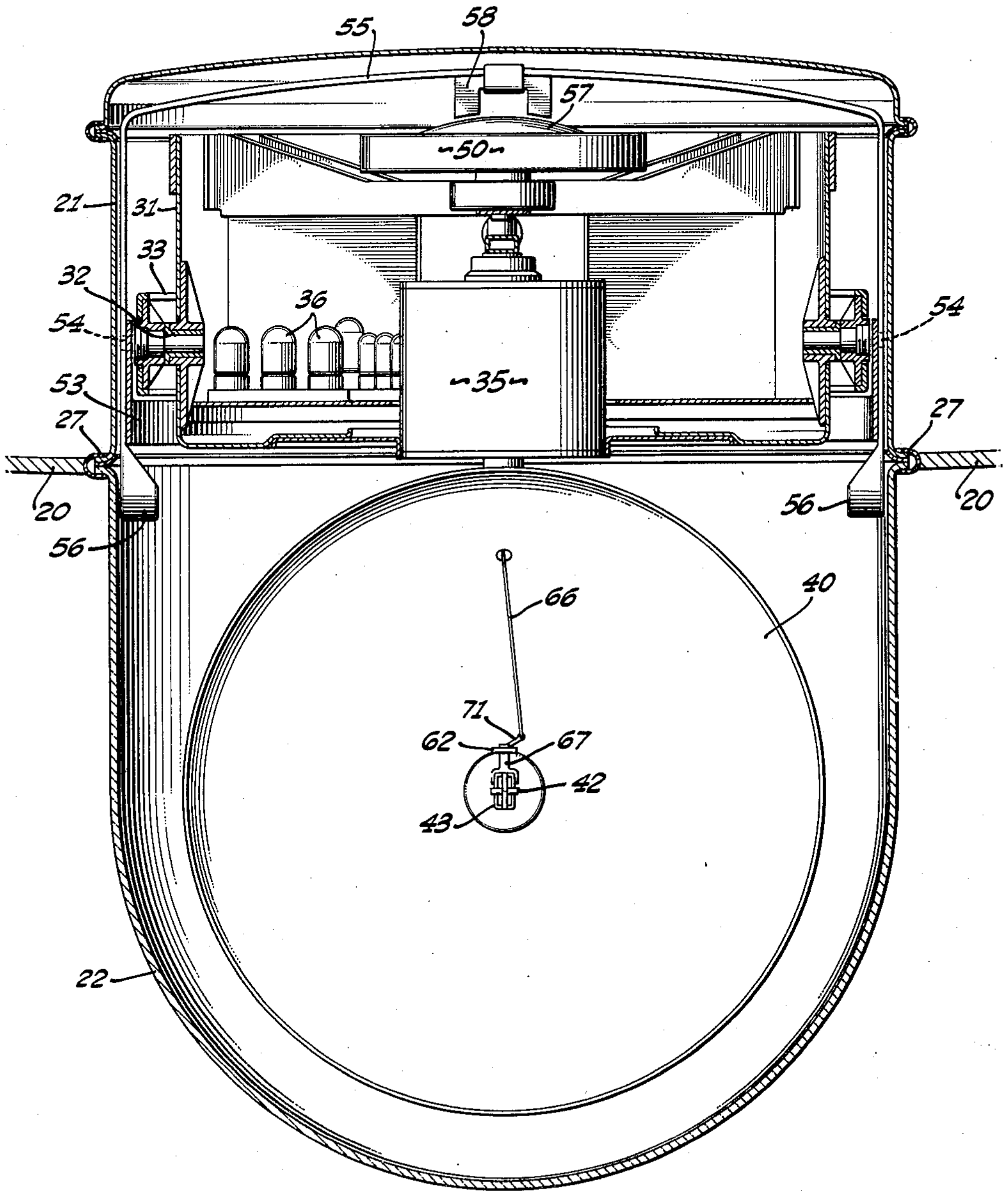
Figure 6:
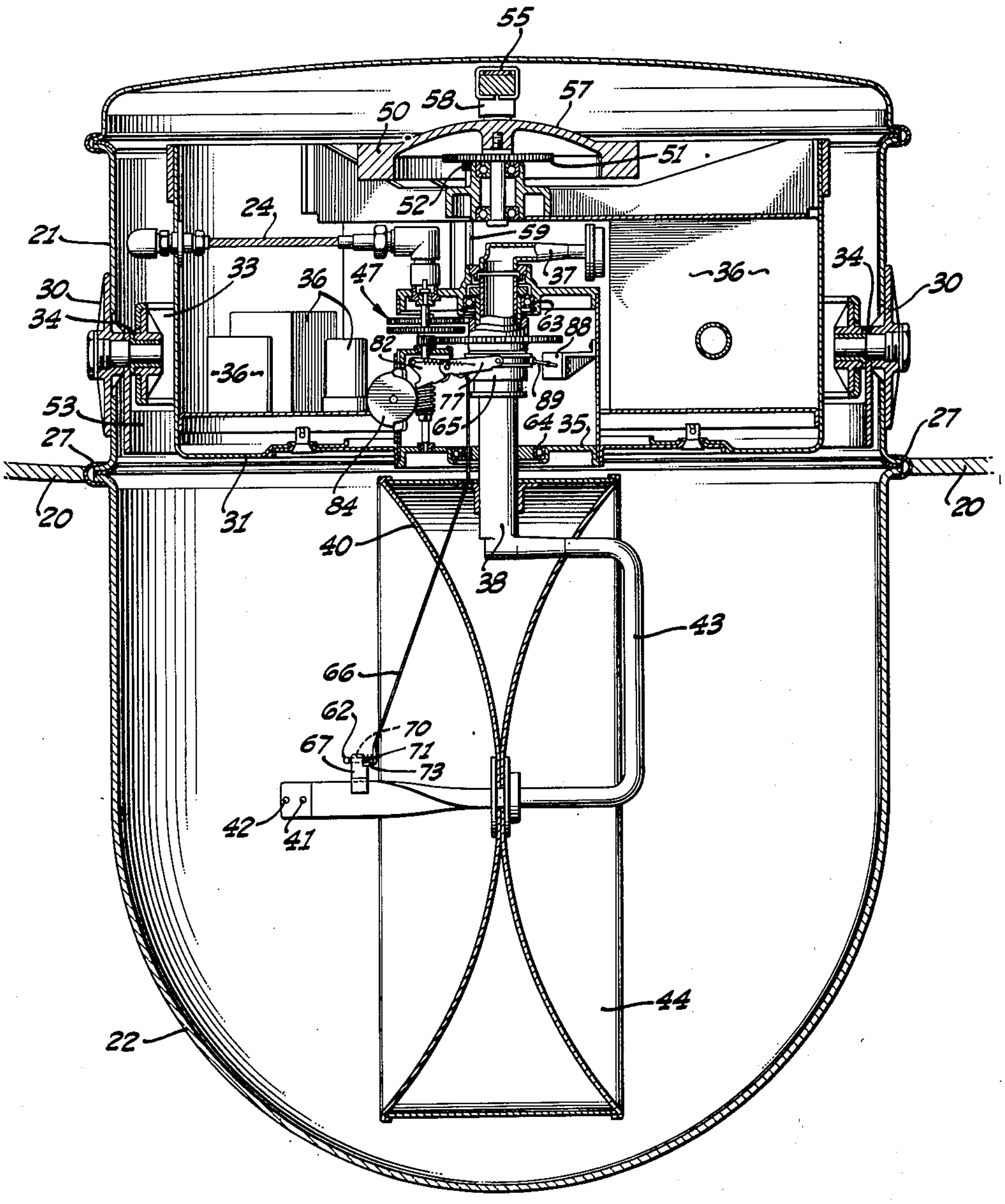
Figure 8:
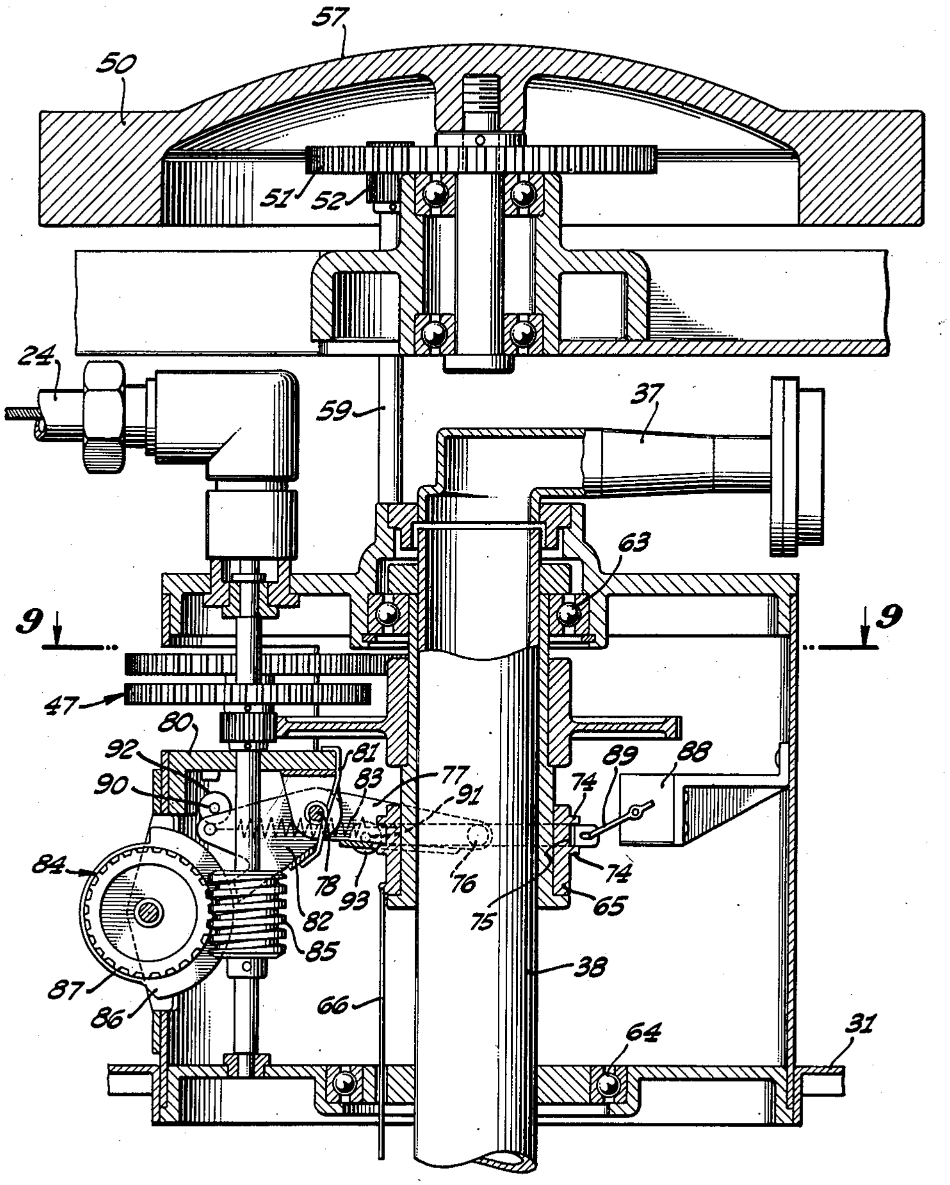
Figure 9:
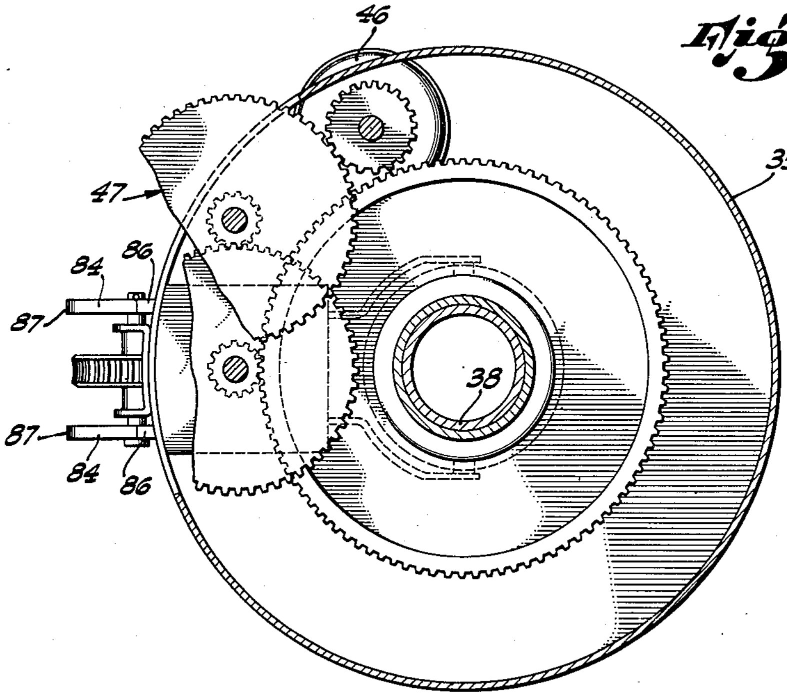
Figure 11:
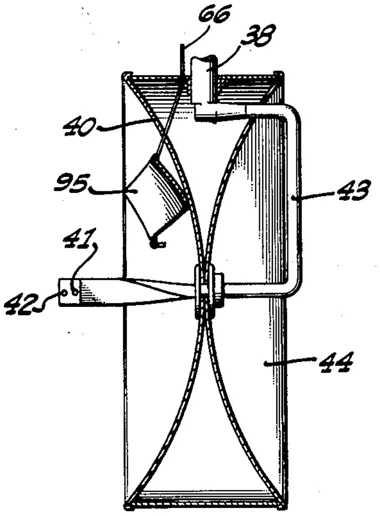
Figure 10:
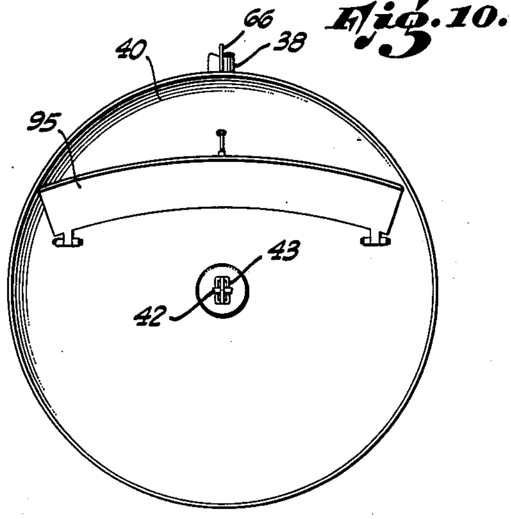
Figure 12:
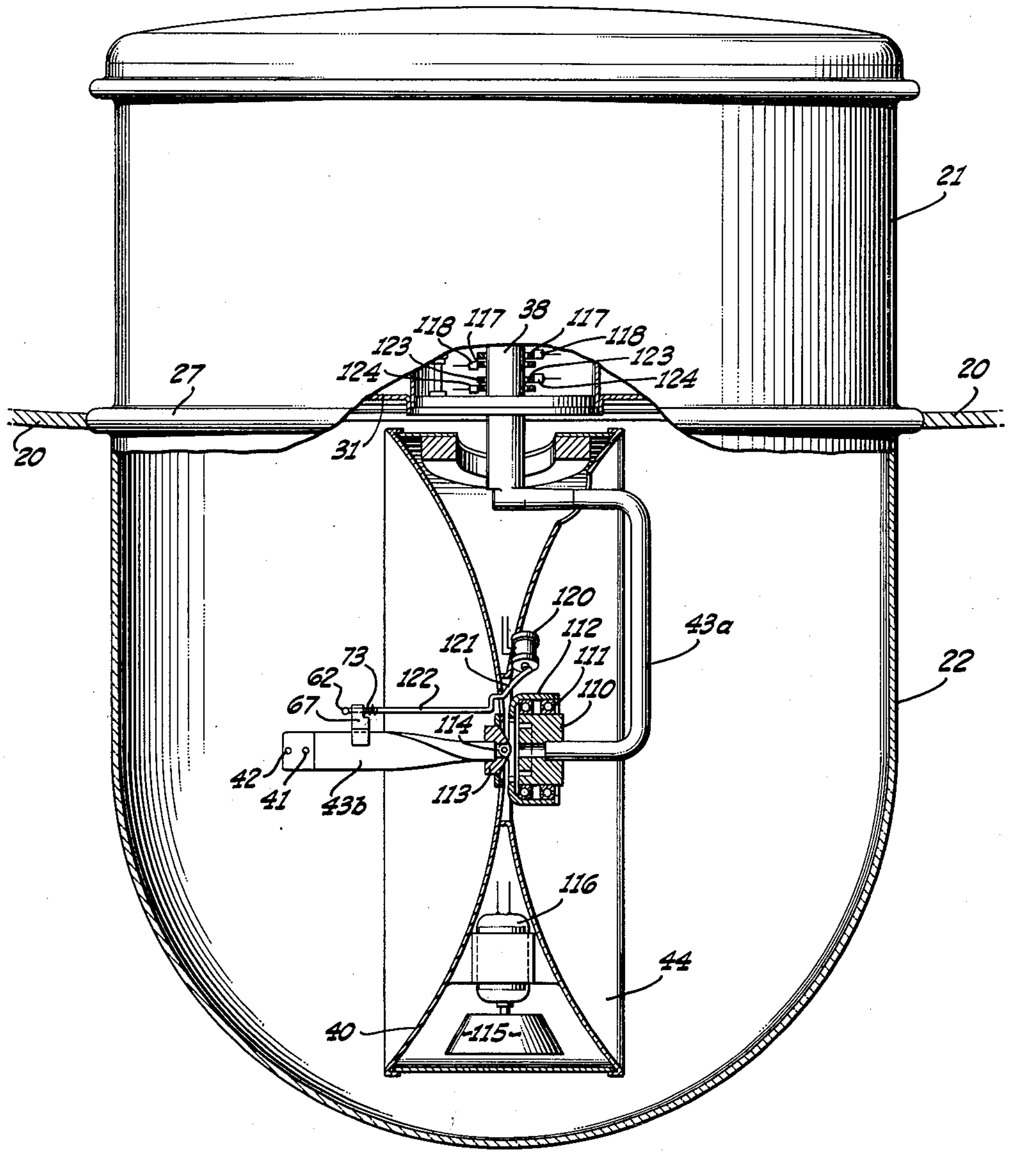

Fig. 3*a* is a schematic representation of the equipment shown in Fig. 3, to a larger scale;

Fig. 4 is a plan view of the device with the cover removed to show the location of the various elements;

Fig. 5 is a cross-sectional view taken at 5—5 in Fig. 4;

Fig. 6 is a cross-sectional view of the device taken at 6—6 of Fig. 4;

Fig. 7 is a perspective view of one form of antenna array used in conjunction with the radar equipment used in the device;

Fig. 8 is an enlarged view of the gyroscope and other rotating and control elements grouped about the center of the device;

Fig. 9 is a plan view of a portion of the elements shown in Fig. 8 and taken at 9—9 therein;

Fig. 10 is a front elevational view of an optional form of reflector and beam control mechanism;

Fig. 11 is a side elevational view, partially in section, of the elements shown in Fig. 10;

Fig. 12 is a side elevational view, partially in section, showing an optional form of device in which only the reflector and antenna are gyro-stabilized.

Figures 13, 14, 15:
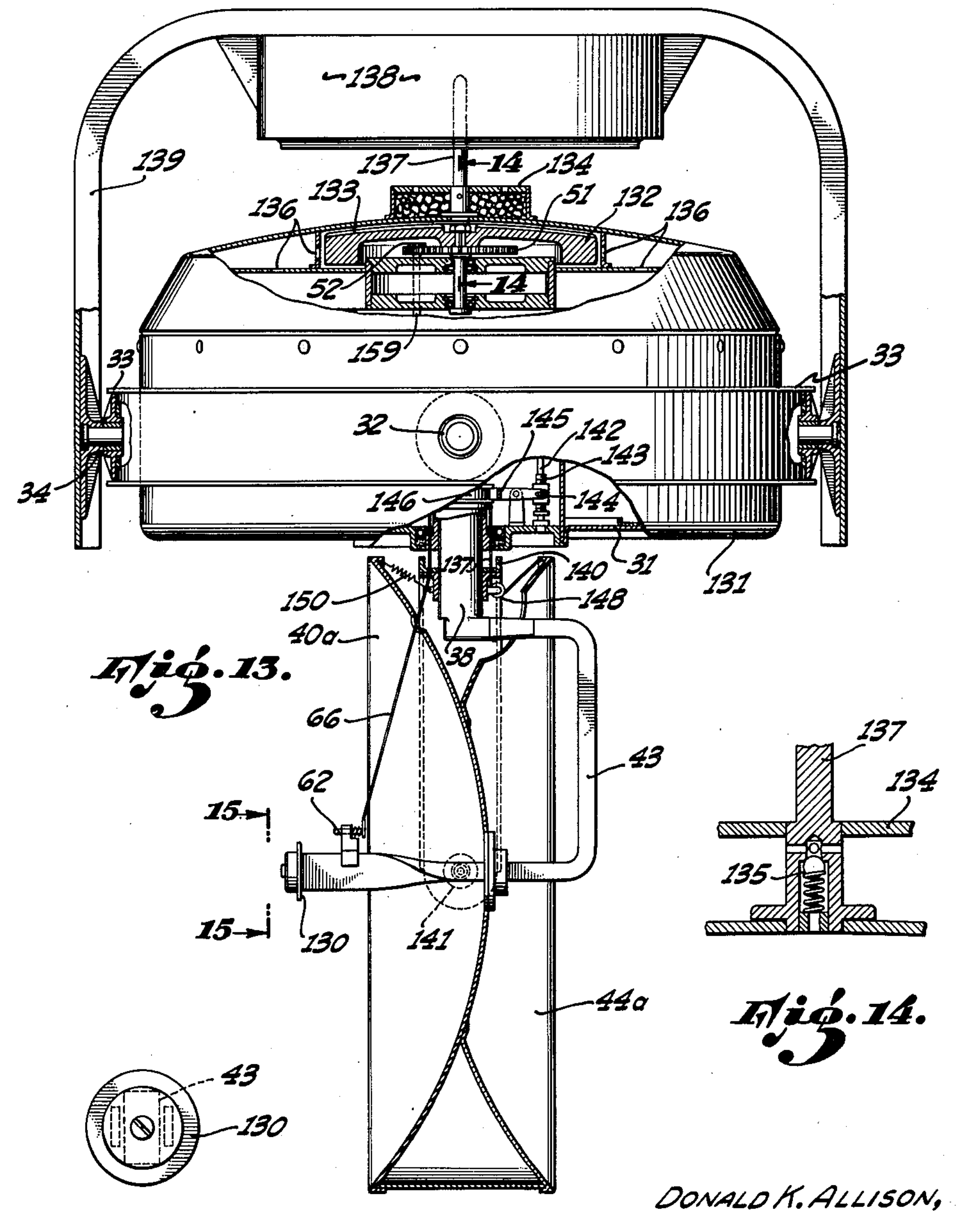

Fig. 13 is a side elevational view, partially in section of still another form of my device wherein the high frequency components of the equipment are operated at a pressure which may be above the ambient atmospheric pressure;

Fig. 14 is a cross-sectional view taken at 14—14 in Fig. 13 and showing the air inlet connection of interior housing; and Fig. 15 is a view taken at 15—15 in Fig. 13 showing a modified form of antenna feed.

Figures 1, 2:
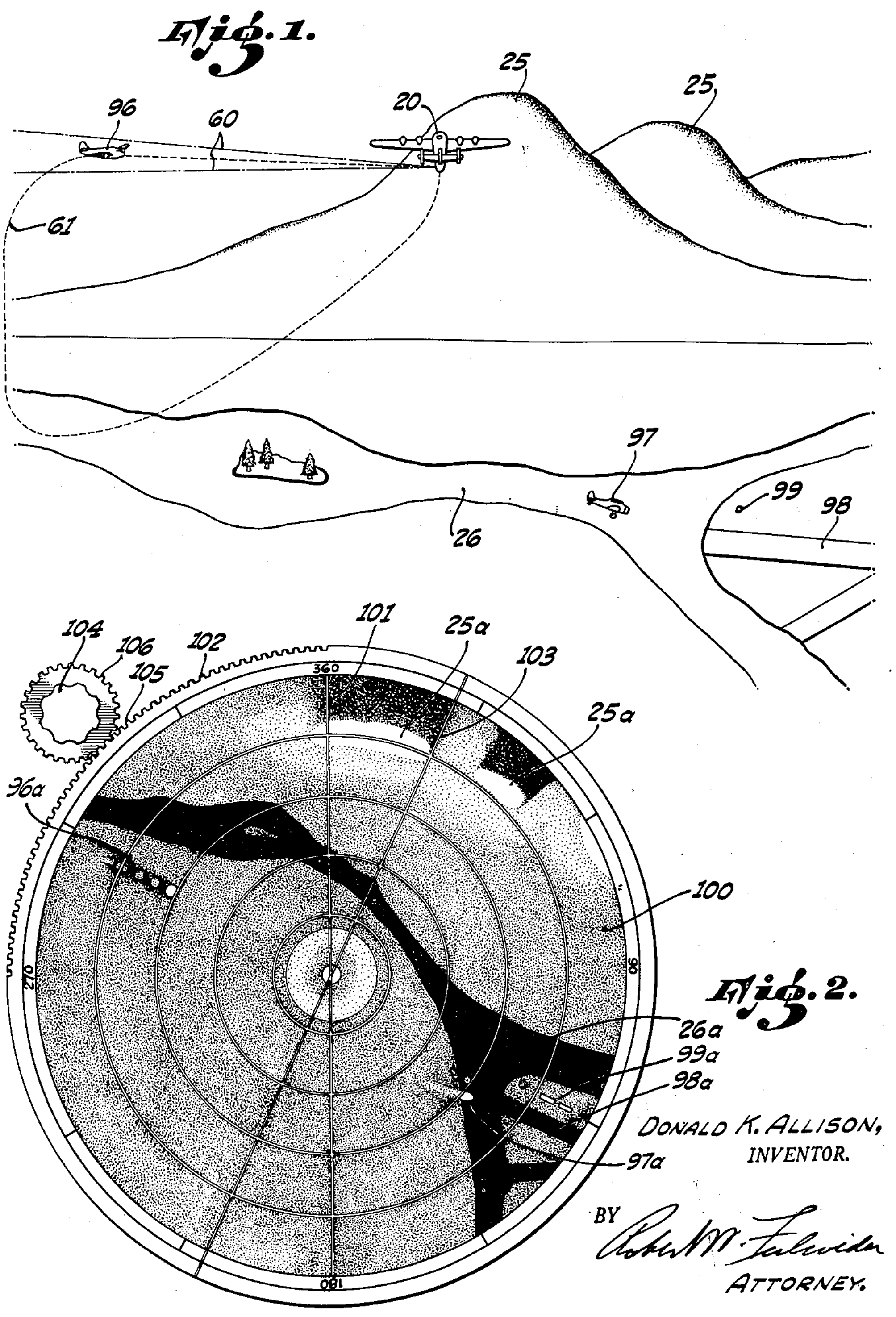
Fig. 1 is a perspective view of an aircraft as it might appear from a following aircraft, illustrating the different types of beams utilized by my device.
Fig. 2 is a view of the screen of the indicator as it might appear in the aircraft shown in Fig. 1.

Referring now to the drawings and particularly to Figs. 1 to 3 thereof, the numeral 20 indicates generally an aircraft having my improved navigational device installed therein. The device includes a housing 21 adapted to be installed in the fuselage with a radome 22, hereinafter described, extending below the surface of the fuselage where it is able to scan the entire terrain. An indicator 23 is located so as to be visible to the pilot or navigator, and is connected to the housing 21 by suitable cables and controls 24. If the aircraft 20 is flying over terrain such as that indicated in Fig. 1, the screen of the indicator 23 will generally appear as shown in Fig. 2 where mountains 25 appear as bright spots 25*a*, river 26 appears as a dark band 26*a*, and other objects are shown in a similar manner.

Portions of the equipment of my improved navigational device, described hereinafter in greater detail, are shown in Fig. 3*a* to indicate general operation of the system.

Included within the housing 21 and the radome 22 is a gimbal supported platform 31 which is stabilized by a gyroscope (not shown in Fig. 3*a*) to maintain the platform horizontal under all conditions. A transmitter T and a receiver R, rotated from their normal positions for the sake of clarity, are mounted on the platform 31 along with other equipment such as a keying mechanism K which controls the operation of the transmitter T. The transmitter T, the receiver R, and the keying mechanism K may be of any well known type, and cooperate to cause the transmitter to generate a series of pulses of high frequency radio waves which are transmitted by means of a wave guide 37, 38 and 43 to an antenna system which includes a parabolic reflector 40. The energy thus radiated is reflected from various objects and returned to the same wave guide and to the receiver R which detects these reflections during the periods when the transmitter T is not operating. A switching mechanism is connected between the transmitter T and the waveguide 37, and a similar mechanism is connected between the receiver R and the waveguide. In Fig. 3*a*, these are illustrated as combined in a single switching mechanism S, and they cooperate to prevent the powerful signal of transmitter T from being transmitted directly to the receiver R to damage the latter, and also cooperate to prevent the weak reflected signals, which should be transmitted to the receiver, from being conducted to the transmitter where their energy is wasted and lost. Signals from the receiver R are conducted by a cable 24*a* to the indicator 23 where they are used to control the operation of a cathode ray tube C in a well known manner. In addition, a sweep circuit generator G is controlled by the keying mechanism K, and sweep voltages are also supplied to indicator 23 over cable 24*a* so that the beam of the cathode ray tube C is caused to sweep radially across the screen of the latter. Such equipment and its operation is well known in the art, and I do not claim it in and of itself as my invention, except as it may me modified or combined with other features.

In order for the system to scan a large area, the antenna system including the parabolic reflector 40 is rotated about the axis of the housing 21 by means of a motor (not shown in Fig. 3*a*) and gear train 47. Waveguide 38 is thus rotated with respect to waveguide 37 and plateform 31, and carries with it the antenna system and parabolic reflector 40 so that the latter rotates in azimuth to provide the desired coverage. From the gear train 47, a flexible cable 24 is connected to rotatable deflecting coils D in the indicator 23 which control the angular position of the beam of the cathode ray tube C. In this way, the position of the beam is synchronized with the position of the antenna system so that a true indication of the terrain and of any obstacles is provided at all times.

In Fig. 6 of the drawings, I have shown a cross-sectional view of the housing 21 and the parts contained therein as they would appear if cut by a plane passing athwartships of the aircraft. As seen in that figure, the housing is supported in the aircraft 20 by suitable structural members (not shown) attached to the housing 21, so that that housing does not move with respect to the aircraft 20, but is rigidly attached thereto at all times. As indicated in Figs. 4 to 6, the housing 21 is generally cylindrical in shape and is provided at its lower end with a dome-shaped member 22 of plastic or other suitable material which is transparent to radio waves of the frequency used in this apparatus. The dome 22 is generally known as the radome, and extends beneath the lower surface of the fuselage as indicated in Figs. 5 and 6. Since the force of the air stream acting upon the radome 22 will be considerable, the latter is rigidly attached to the housing 21 and is preferably provided with a seal 27 between it and the latter, and between it and the fuselage of the aircraft 20.

Referring to Fig. 5, the housing 21 encloses a platform 31 which is pivotally attached by bearings 32 to a gimbal ring 33 for rotation about a fore and aft or longitudinal axis; and the gimbal ring in turn is pivotally attached by bearings 34 as shown in Figs. 4 and 6, to the bearing support members 30 for rotation about an athwartships or lateral axis. The bearings 32 and 34 and the gimbal ring 33 thus provide a suspension for the platform 31 which permits it to remain level at all times regardless of the roll or pitch of the aircraft. The platform 31, however, is not free to rotate about a vertical axis, and hence its position in azimuth with respect to the aircraft is always the same.

As shown in Figs. 5 and 6, a center post construction 35, hereinafter described in detail, is mounted in the center of platform 31; and grouped around the center post are the various components, indicated generally by the numeral 36, of a radar scanning system, including a transmitter, a receiver, and a power supply. These components are well known in the art, and may be of any suitable type and design in which a transmitter sends out a series of pulses of high frequency radio waves, and the receiver detects or picks up the reflections of these pulses during the period when the transmitter is not operating. One example of a system having these general characteristics is shown in an article by R. C. Jensen and R. A. Arnett in the Transactions of the American Institute of Electrical Engineers, vol. 65, pps. 307 to 313 (May 1946). Such a system and the components comprising it, in and of themselves, form no part of my invention, and I do not claim them except as they are modified and adapted for use in my navigational device.

As is customary in such equipment, a waveguide is used to connect the antenna to the transmitter and receiver. To permit the rotation of the antenna about a vertical axis, one element of the waveguide is formed with a circular cross-section and mounted so as to be coaxial with the platform 31. This construction is clearly indicated in Fig. 6, and an enlarged view of the waveguide with other pertinent equipment is shown in Fig. 8. As shown in Fig. 6, a horizontal section of waveguide 37 is coupled to the vertically extending circular section of waveguide 38 which is rotatable with respect to the waveguide 37, and which is built with sufficient strength to act as the support for the various members about to be described, below the platform 31. Beneath the platform 31, and supported by the wave guide 38, is a parabolic reflector 40 having an antenna 41 at its focal point. A reflector dipole antenna 42 is located the proper distance in front of antenna 41 so that substantially all of the energy received by or transmitted from the antenna 41 strikes the parabolic reflector to be focused thereby, and the effects of radiation not striking that reflector are reduced to a minimum. The antenna 41 and the reflector 42 are preferably dipoles; and since such devices are well known in the art they are not further described here. The waveguide 38 is coupled to the antenna 41 by another section of waveguide 43, and since the latter will generally have a rectangular cross-section, it is preferably formed as shown in Fig. 6 so that the antenna may be properly oriented with respect to the parabolic reflector 40.

As may be surmised, the waveguides 38 and 43, the reflectors 40 and 42, and the antenna 41 are rotated as a unit within the radome 22; and to provide static and dynamic balance of the rotating assembly, a dummy reflector 44, of approximately the same weight and shape as the parabolic reflector 40, is mounted back to back with the latter so that there is no tendency of the rotating assembly to pivot about a horizontal axis; dynamic forces acting upon the assembly during its rotation are substantially balanced; and friction and windage forces are likewise substantially balanced. These latter features are quite important since, though the rate of rotation of the assembly is relatively low, any considerable unbalance will disturb the equilibrium of the system and produce erratic results.

To rotate the waveguide 38 and the equipment supported by it, I provide a motor 46, shown in Fig. 9 but omitted from the other drawings for the sake of clarity, which, through a gear train indicated as 47, rotates the waveguide 38 at a suitable speed. I have found that a speed of 30 R. P. M. is very satisfactory, but other speeds between 5 and 100 R. P. M. may be used. The particular gears and their relative sizes will be determined by the normal speed of motor 46, and the speed of rotation of the waveguide 38 is not critical, though it should be sufficient to indicate the change of position of other rapidly moving objects such as aircraft. From one of the gears of the gear train 47, a connection is made through flexible shaft 24 to the indicator 23 so that the position of the trace on the latter is correlated with the position of the reflector 40 in azimuth. The flexible shaft 24, of course, is provided with the proper connections and routed so that it provides a minimum of restraint for the platform 31 and the elements supported by the latter. Tilting of the platform 31 will tend to rotate the flexible shaft 24; and to reduce the error thereby introduced in the indicator 23, the shaft is preferably connected to the gear train 47 near the high speed end thereof, and it controls the indicator through a reduction gearing at the latter so that a small rotation of the shaft produces a negligible error in the indicator.

To maintain the platform 31 in a horizontal plane so that the axis of the waveguide 38 is vertical at all times, I provide a gyroscope and an erecting system which will tend to maintain the platform in a horizontal position, and will tend to restore it to that position should it be displaced therefrom. Coaxial with the waveguide 38 and mounted above the latter at a point just below the top of housing 21, I mount a flywheel 50 which is statically and dynamically balanced and has sufficient rotational inertia to provide the necessary gyroscopic rigidity for the equipment. The flywheel 50 is driven by a gear 51 mounted on the same shaft as the flywheel, and engaged by a pinion 52 which in turn is connected by shaft 59 to the gear train 47. Thus the motor 46 which drives the waveguide 38 also drives the flywheel 50, though to produce the necessary gyroscopic effect of the latter, it must be driven at a much higher speed and consequently is connected to a different point in the gear train. The various elements supported by the platform 31 are located and balanced so that the parts have no tendency to rotate about either horizontal axis, and hence the gyroscopic system including the flywheel 50 may be said to be non-pendulous. There is thus no tendency for any lateral or longitudinal acceleration or forces to act upon the gyroscope and cause it to erect to a false vertical or to precess when the aircraft rolls or pitches.

However, since the system is non-pendulous, some method must be provided to erect it to the vertical and to maintain it in that position, since friction or other forces may cause the gyroscope to precess. While other types of mechanism may be used, I prefer to use the form indicated in Figs. 5 and 6 wherein it is seen that a secondary gimbal ring 53 is pivotally attached to the bearing 34 so as to be free to move about a lateral horizontal axis independently of the gimbal ring 33. As shown in Fig. 4, the gimbal ring 53 is in the form of a complete circle like gimbal ring 33; and like gimbal ring 33, is provided with additional bearings 54 (Fig. 5) to provide a horizontal axis of rotation perpendicular to the axis provided by bearings 34. Bearings 54 support a bail 55 which extends over the top of the flywheel 50 and is provided with counterweights 56 which render the bail slightly pendulous. The center portion 57 of flywheel 50 is given the shape of a sphere having its center at the intersection of the axes determined by bearings 32 and 34, and a permanent magnet 58 is held by the bail 55 so as to be just above the center portion 57. The magnet 58 is formed as a U-shaped magnet with its poles spaced a very small distance from the center 57, and since the latter is formed as a portion of a sphere, the platform 31 may move about either or both of its horizontal axes without changing the spacing between the poles of the magnet and the center. When flywheel 50 is rotated, magnet 58 will set up eddy currents in center 57 which will act as a slight drag on the flywheel, and normally the effect of these eddy currents will be balanced so that the only effect of the magnet is to provide a slight additional load on motor 46. However, when magnet 58 is displaced from the middle of the center portion 57, these eddy currents will provide an unbalanced drag which will tend to cause the gyroscope to precess until the magnet and the flywheel 50 are again centered with respect to each other. The erecting force which is provided by magnet 58 is preferably quite small, and the platform 31 with its associated equipment will thus be erected relatively slowly should it be in a non-vertical position when the flywheel 50 is rotating. This feature is quite desirable, however, since lateral acceleration, particularly noticeable when the aircraft banks, will move the pendulously mounted weight to a false vertical but will not move the platform 31 from the horizontal unless the acceleration is continued for an extended period of time. The latter condition is not likely to occur in normal aircraft operation, and the platform 31 thus remains horizontal as the aircraft rolls and pitches.

While terrain indicators have been used before, these previous devices have required that the aircraft be maintained in the same altitude while the same indication is being observed. To provide a continuous indication throughout a flight of relatively long duration, this procedure is very difficult if not impossible, and consequently some method of stabilization such as I have shown and described is necessary if a satisfactory and practical system is to be had. If the parabolic reflector 40 is not rotated in a horizontal plane, i. e., if the axis of rotation of the waveguide 38 is not vertical, the area scanned by the radar equipment will be non-symmetrical and will indicate the aircraft to be directly over a point on the terrain actually some distance away.

If the reflectors 40 and 42 are used with the dipole antenna 41 without any modification, the radar equipment will scan a horizontal circle with a beam having a spread of approximately 4 to 6 degrees. This relatively narrow beam, shown in Fig. 1 as beam 60, may be referred to as a "pencil" beam, because of its narrowness. Since all of the energy of the transmitter is concentrated into this relatively narrow pencil, any object hit by the rays will reflect a relatively large quantity of them, so that a relatively strong echo is obtained. If the gain-limiting control of the receiver is made inoperative, a very strong indication may be observed on the indicator screen, and objects at a considerable distance from the aircraft may be detected.

However, to indicate the terrain over which the aircraft is flying, a different type of beam is necessary to radiate energy downwardly and to detect the reflection from the objects beneath the aircraft. Such a beam is the heretofore described "cosecant-squared" beam indicated at 61 in Fig. 1 and adapted to direct a portion of its energy downwardly as well as generally horizontally. The width of the beam in azimuth is approximately the same for both the pencil and the cosecant-squared beam, but as indicated, the vertical coverage is quite different. It is to be understood that the beams 60 and 61 indicated in Fig. 1 are merely illustrative and that the actual beams may have different shapes and energy distributions. Furthermore, the energy distribution in the beam does not conform exactly to the pattern indicated, the latter merely representing the boundaries where the energy level is approximately one half that of the maximum energy level in the beam.

Various methods have been developed for producing a cosecant-squared beam with a dipole-reflector combination similar to that previously described, and one of the simplest arrangements makes use of a small independent dipole 62 mounted rearwardly and somewhat above the antenna dipole 41. To secure these results from the use of the independent dipole 62, it must be mounted parallel to the antenna dipole 41; and a dipole in this position and properly mounted is shown in Fig. 7. As shown in that view, the independent dipole 62 may conveniently be mounted on the waveguide 43 in front of the parabolic reflector 40, and behind the antenna dipole 41. In this position, the independent dipole 62 acts as a reflector to direct a portion of the energy from antenna dipole 41 downwardly to provide the cosecant-squared beam used to furnish the terrain indication. The use of the independent dipole 62 to obtain the cosecant-squared beam is not my invention, and I make no claim to it in and of itself, except as it may be modified and combined with other elements as hereinafter described.

When the independent dipole 62 is rotated about a horizontal axis so that it is perpendicular to the antenna dipole 41, the reflecting characteristics of the dipole are completely changed and it has substantially no effect upon the pattern of the beam emitted by antenna 41. Under these conditions, the pattern of the beam is determined by the parabolic reflector 40 and the reflector 42 to produce a pencil beam which may be used for collision warning. By providing means to rotate the independent dipole 62, the screen of the indicator 23 may be caused to indicate the terrain, or to indicate the presence of obstacles at the same altitude as the aircraft with which the latter might colide. By making a complete sweep in azimuth with the cosecant-squared beam 61 and then making a complete sweep with the pencil beam 60, the indicator screen will show the features of the terrain at a somewhat lower intensity, while objects with which the aircraft might collide will be indicated on the screen, superimposed upon the terrain indication, but much brighter. By using a screen in the indicator 23 which has long persistence, the features of the terrain will be visible at all times, while obstacles in the aircraft's path will stand out with great clarity. The increased brilliance of the obstacles comes as a result of the fact that these obstacles are detected both by the cosecant-squared beam and the pencil beam; and also by reason of the fact that the energy return when using the pencil beam is greater, as previously described, and the gain-limiting device of the receiver is rendered inoperative during the operation of the pencil beam.

While various cycles of operation may be used, in the preferred form the device is intended to make one sweep with the cosecant-squared beam and then make the next sweep with the pencil beam. The cycle is then repeated, and if the waveguide 38 and its suported equipment is rotated at a speed of approximately 30 R. P. M., the long persistence screen of the indicator 23 will indicate the objects as thus described.

While various means may be used to provide the shift from pencil to cosecant-squared beam scanning and vice versa, I have found that the method shown in Figs. 6 and 8 is very satisfactory, and possesses a versatility not shared by some other methods. As shown in these figures, the waveguide 38 which is rotatably supported by bearings 63 and 64 and driven by gear train 47, is provided with a slidable collar 65 located between the gear train 47 and the lower bearing 64. The collar 65 is axially slidable on the waveguide 38, and rotates with the latter so that it maintains the same angular position relative to the parabolic reflector 40 at all times. A flexible cord 66, preferably of an insulating material, extends downwardly from the lower end of collar 65, through the rotating portion of bearing 64, and to the independent dipole 62 previously described. As indicated in Figs. 6 and 7, the independent dipole 62 is mounted on the waveguide 43 by a block 67 carrying a rotatable shaft 70 therein which supports the dipole 62 at its forward end. The rear end of the shaft 70 is provided with an angularly positioned arm 71 extending radially outwardly therefrom and having an eye 72 formed at its outer end. A spring 73 urges the shaft 70 and the dipole 62 to a position where the latter is perpendicular to the antenna 41; but by pulling upwardly on the eye 72 the shaft may be rotated to turn the independent dipole 62 to a position where it is parallel with the antenna 41. This latter position is shown in Figs. 5, 6 and 7. By attaching the lower end of the cord 66 to the eye 72, the vertical movement of the collar 65 is caused to rotate the independent dipole 62 to change the beam pattern from that of a pencil scan to the cosecant-squared scan.

To move the collar 65 axially along the waveguide 38, the collar is provided with a pair of spaced flanges 74 forming a groove 75 therebetween into which a pair of trunnions 76 of a fork 77 are fitted. The opposite end of fork 77 is pivotally mounted on a horizontal shaft 78 which is firmly supported by platform 31. As shown in Fig. 8 this is preferably accomplished by means of a bracket member 80 which supports a portion of the gear train 47; and a spring 81 bears against the bracket and against a cam follower 82 which is pivotally attached to shaft 78. Spring 81 urges cam follower 82 upwardly, in a clockwise direction as shown in Fig. 8, and an over-center spring 83 connects the cam follower 82 to the fork 77 so that upward movement of the cam follower snaps the fork 77 upwardly and with it the collar 65 to move the independent dipole 62. Downward movement of the cam follower 82, of course, causes the fork 77 to be moved downwardly so that the independent dipole 62 is moved to a position perpendicular to the antenna 41.

In order to synchronize the movement of cam follower 82 with the rotation of the waveguide 38 and the equipment associated with the latter, I provide a cam 84 which is driven by a gear 85 connected to the gear train 47 so that the cam makes one complete revolution for each complete scanning cycle. The cam shown is intended for an application where there is one sweep of a cosecant-squared beam, followed by one sweep of a pencil beam. Consequently, the cam 84 is designed to have a high dwell 86 which moves the cam follower 82 downwardly during one half of the rotation of the cam, and a low dwell 87 which permits the cam follower to move upwardly during the remaining portion of rotation. Cams with different proportions of high and low dwells may be used if a different sequence of scanning is to be used, in which case the speed of rotation of the cam with respect to the waveguide 38 is changed.

Under certain conditions it may be desirable to eliminate the sequential scanning provided by this device, and to use only a single type of scan, whether it be of the cosecant-squared type, or of the pencil type. I have provided means for securing this result by the provision of solenoid operated plungers 90 and 91 which are adapted to lock the fork 77 in either of its limiting positions. The fork 77 may also be used to operate a switch 88 to disconnect the limiter from the receiver so that the maximum sensitivity of the latter is obtained whenever the pencil scan is used. Plungers 90 and 91 are operated by solenoids 92 and 93 respectively, which may be controlled by appropriate switches, and the solenoids are normally de-energized, and the plungers retracted so that the fork 77 and the cam follower 82 are free to move in the previously described manner. When it is desired to scan solely with a pencil beam, however, solenoid 92 is energized so that plunger 90 is extended to bear against the upper surface of cam follower 82 to prevent it from moving to the low dwell portion 87 of the cam under the urging of spring 81. The collar 65 will thus be held in its lower limiting position, and the independent dipole 62 will remain perpendicular to the antenna 41 and a pencil scan will result.

Should it be desired to scan solely with a cosecant-squared beam, solenoid 93 may be energized to extend plunger 91 so that the fork 77 will be held in raised position with its lower surface bearing against the plunger. Under these conditions, collar 65 is held in its upper limiting position, and the independent dipole 62 is held parallel to antenna 41. In the normal sequential operation of the collar shifting means, this position of the collar 65 is had when the cam follower 82 bears against the low dwell of cam 84; and when the cam follower rests upon the high dwell 86 the fork 77 is moved downwardly. However, when plunger 91 prevents this downward movement of the fork 77, the cam follower 82 moves as usual, but spring 83 is merely elongated without producing the normal movement of the fork. Should either of the solenoids 92 or 93 be energized when the fork 77 or the cam follower 82 is in such a position that the plunger cannot bear against the intended surface, the plunger merely bears against the side of the associated member until such time as the cam 84 produces the proper movement.

Fork 77 may also be used to operate a switch 88 to disconnect the limiter from the receiver so that the full sensitivity of the latter is secured when the collar 65 is in its lowermost position, and the independent dipole 62 is perpendicular to the antenna 41. Such an arrangement, as previously mentioned, provides an increased sensitivity and indication on the screen of the indicator 23 of any obstacles at the same altitude as that of the aircraft. For convenience in illustration, switch 88 is indicated in Fig. 8 as having an operating member 89 projecting into groove 75 so that the switch is open when the roller 65 is in one of its limiting positions, and closed when in the other, though it will readily be seen that other actuators may be used.

Under certain conditions it may be desirable to tilt the beam while the latter is rotating about a vertical axis; by using the pencil beam in this way, it is possible to determine the height of a mountain, or whether it is possible to fly above or below a storm. Similarly, when using the cosecant-squared beam at high altitudes, it is possible to eliminate the "blind spot" caused by the insufficiency of energy normally radiated directly downwardly. This tilting of the beam may be accomplished by mounting the parabolic reflector 40 and dummy reflector 44 on a fork for pivotal movement about a horizontal axis passing through the center of the reflector 40. The antenna 41 and waveguide 43 may be held stationary, and the reflectors 40 and 44 may be moved by a sliding collar arrangement on waveguide 38 similar to that described for moving the independent dipole 62.

It will thus be seen that I have provided a device in which sequential scanning by a pencil beam and a cosecant-squared beam is developed, the entire device being gyro-stabilized by the weighted wheel 50. The entire device is balanced so that it is non-pendulous about either of its axes, and the gyroscope acts as a so-called "brute force" gyroscope which stabilizes the device directly without the use of pick-ups, amplifiers, and servo motors.

Should it be undesirable to use the independent dipole 62 to change the pattern of the beam from that of a pencil beam to a cosecant-squared beam, a movable portion 95 may be hingedly attached to the parabolic reflector 40 and operated by the cord 66 in much the same manner as the independent dipole is rotated. Such an arrangement is shown in Figs. 10 and 11, wherein it is seen that the movable member 95 is pivotally attached along its lower edge to the parabolic reflector 40 and is held against the latter by the cord 66 when collar 65 is in its upper limiting position. When collar 65 is moved to its lower limiting position, the upper edge of movable member 95 moves downwardly to the position shown in Fig. 11, thereby distorting the field of the radiated beam and producing a beam having the characteristics of the previously mentioned cosecant-squared beam. Normally gravity will be sufficiently strong to move the movable member 95 to the position shown in Fig. 11, but if desired, springs may be incorporated in the hinge members attaching the movable member to the parabolic reflector 40 to urge the movable member downwardly. With such an arrangement, of course, the previously mentioned switch controlling the operation of the receiver limiting circuit would be modified so that the limiter would be effective when the collar 65 is in its lower position, corresponding to the scanning by the cosecant-squared beam. Other methods of modifying the shape of the beam employed in the operation of this device may be used, but the two methods shown are simple and trouble-free and produce the desired pattern.

The versatility of my improved navigational device may be further improved by the addition of certain elements to the indicator 23. As shown in Fig. 2, the screen 100 of the indicator is provided with a lubber line 101 to indicate the heading of the craft with respect to the terrain, and degree indications are placed around the periphery of the screen 100. In addition, a drift indicator is provided which is used in conjunction with the terrain indication to show the true path of the craft regardless of its heading. The drift indicator includes a rotatable member 102 having an indicator line 103 thereon, and a manually rotatable knob 104 operable to rotate the member 102. While various forms may be used, I prefer to form the rotatable member 102 of a transparent material such as Celluloid, Lucite, or glass, and place the indicator line 103 thereon. The latter may be painted or scribed, and should be readily distinguishable from the lubber line 101. Around the periphery of the member 102 I provide a series of teeth 105 which are adapted to mesh with the teeth of a pinion 106 carried by the knob 104; and by rotating the knob, the indicator line 103 may be aligned with the path of objects across screen 100 to indicate the drift angle of the craft. A plurality of lines (not shown) parallel to indicator line 103 may be provided to insure the alignment of an object with an indicator line, should such construction appear desirable.

*Operation of preferred form*

To use my improved navigational device, as described above with particular reference to Figs. 1–11, the switches controlling the radar equipment are closed so that the equipment is energized, though preferably not operating, to permit the various components to warm up and achieve stable operating conditions. The switch controlling the operation of motor 46 is likewise closed, and the flywheel 50 starts to rotate while the magnet 58 provides a force tending to erect the system so that the platform 31 is horizontal. It is desirable that this procedure be followed before the aircraft has left the ground, for in this way the equipment will be in standby condition, and ready for instant operation when the craft is airborne.

When it is desired to place the radar equipment in operation, it is only necessary to close the switches which transfer the equipment from standby to operating condition and the image of the terrain will appear upon the screen of the indicator 23. Because of the erecting characteristics of magnet 58, the flywheel 50, acting as a gyroscope, has been erected to a true vertical position, carrying with it the platform 31 and all components attached thereto. Movement of the aircraft about its roll or pitch axes will not disturb this horizontal position of platform 31, since the latter is supported by the gimbal ring 33 and the bearings 30 and 32. Movement of the aircraft about its yaw axis will rotate the housing 21 and all equipment with it about a vertical axis, but this will have no effect upon the gyroscopic stability of the system, since this axis is parallel to the axis of rotation of the flywheel 50. Since the bail 55 which varies magnet 58 is made slightly pendulous, the flywheel 50 will be continuously erected to the true vertical as the aircraft travels above the surface of the earth. Momentary deviations of the bail 55 from the true vertical, caused by lateral or longitudinal acceleration, will have substantially no effect upon the position of flywheel 50 since the restoring force exerted by the magnet 58 is so small as to be negligible under the circumstances. Consequently, the platform 31 will be horizontal at all times and the parabolic reflector 40 will scan the terrain in a true azimuthal position.

With the transmitter and receiver operating and with the parabolic reflector 40 rotating as previously described, the transmitter causes a series of pulses to be radiated from the dipole 41, and the reflections from these pulses are detected by the receiver during the period the transmitter is not operating, with the output of the receiver being transmitted to the indicator 23 to appear on the screen thereof. Assuming that the first sweep of the terrain is by a cosecant-squared beam, the features of the terrain appear upon the screen of the indicator in a manner similar to that shown in Fig. 2. Because of the long persistence characteristics of the screen, the image of the terrain continues throughout the next sweep, though progressively growing fainter. If the next sweep is to be by a pencil beam, the cam 94 moves the collar 65 to the appropriate position and the beam emitted from the parabolic reflector 40 is the narrow beam previously described. This beam sweeps in a substantially horizontal arc, and the reflections from its pulses indicate the presence of obstacles such as mountains or airborne craft at substantially the same altitude as the aircraft 20 with which the latter might collide. Since it is obviously important that the sweep of the pencil beam be in a horizontal plane to give a true indication of the presence of obstacles at the same elevation as the aircraft, it is very important that the mounting for the parabolic reflector 40 be stabilized by gyroscopic instead of pendulous means to avoid the effects of rolling and pitching of the aircraft. In Fig. 1, an aircraft 96 is shown at the same altitude as aircraft 20, and this is indicated at 96*a* in Fig. 2, where it is seen that successive sweeps of the pencil beam have produced a series of spots moving toward the center of the screen, i. e., toward aircraft 20 with the spots successively fading, but with the most recent or innermost spots being very bright. This would indicate to the pilot of the aircraft 20 that a plane is approaching him at a relatively high speed with a possible collision imminent unless one of them changes his course. With this information, the pilot may take the necessary precautionary steps to insure the safety of his plane and passengers.

An aircraft not at the same altitude as aircraft 20 but much below the latter is shown at 97 in Fig. 1 and is indicated at 97*a* in Fig. 2. Since the aircraft 97 is not detected by the pencil beam scan 60, it appears as a fainter image than that of aircraft 96, since the presence of aircraft 97 is detected only by the cosecant-squared beam. The relative rapid movement, however, of spot 97*a* indicates that it is an aircraft, and its relationship to the airport 98 indicates that it is probably about to land at the latter.

While it forms no part of my invention, it is interesting to note that a radio beacon 99 has been developed for use at airports and other suitable locations which will send out a coded pulse when the beacon antenna is crossed by the sweep of a radar beam. This coded pulse is indicated at 99*a* in Fig. 2.

When a thunderstorm or similar meteorological disturbance is within the range of the radar equipment, its presence will be detected and indicated on the indicator screen by the pencil beam. The indication generally takes the form of a large hazy mass, caused by the radio waves penetrating varying distances into the storm before being reflected back. When such an indication appears, the pilot may switch from sequential scanning to pencil beam scanning and then tilt the parabolic reflector 40 upwardly and downwardly to determine the altitude of the base of the storm and the height it extends into the air. Should it be found impractical to fly above or below the storm, the pilot may then change his course to fly around it.

It will thus be seen that I have provided a stabilized mounting for a radar terrain indicator, and have combined this with an obstacle detection system so that the terrain and obstacles with which the aircraft might collide are both indicated on the same indicator screen. Furthermore, by the use of sequential scanning I am able to accomplish both of these results with substantially no more equipment and at no particular increase in weight than has previously been required in systems for either of these purposes alone. In addition, by the provision of the solenoid operated plungers 90 and 91, I am able to secure either terrain indication or obstacle detection alone with results which are the equal of those previously obtained by equipment designed for but a single purpose. Since the same objects, e. g., mountains, beacons, etc., may be detected by both the pencil beam and the cosecant-squared beam; and in addition, since the location of obstacles must be correlated with the terrain, it is quite essential that both beams sweep substantially the same area at all times. Otherwise, if the aircraft were rolling or pitching through large angles, the intersection of the cosecant-squared beam with the terrain would be displaced, successive sweeps would not cover the same area, and the apparent displacement of objects would cause confusion. I have solved this problem by providing gyro-stabilization, and thus have secured reliable and usable results.

*Description of Fig. 12*

While the device shown in Figs. 4 through 11 is very satisfactory for use where it is contemplated that the angle of pitch or roll will not exceed a relatively few degrees, it is sometimes desirable to provide a device which operates satisfactorily where much greater deviations in the altitude of the aircraft are anticipated. This situation is particularly true in the case of military aircraft, or in the case of commercial aircraft operated out of airports which are surrounded by relatively high mountains. For these conditions I have developed the form shown in Fig. 12, having substantially all of the various components shown in the preferred form of Figs. 4 to 11. In this form, the housing 21 is provided with a radome 22, and is mounted in the fuselage of the aircraft 20 so that the radome projects therefrom. The platform 31, however, instead of being supported by a gimbal ring for movement about two perpendicular horizontal axes, is rigidly attached to the housing 21 to move with the latter. Similarly, the flywheel, bail, magnet, and associated equipment of the preferred form are omitted from the optional form and the waveguide 38 is thus coaxial with the housing 21 at all times. The cam, follower, and fork are modified in an obvious manner to operate a switch instead of moving the collar axially along waveguide 38 between two limiting positions. The waveguide 38, however, is rotated as previously described, and is connected to the various components of the radar equipment and to the indicator 23 in the same manner as in the preferred form.

The lower end of waveguide 38 is coupled to a waveguide 43*a*, similar to waveguide 43, but terminated short of the twisted section of the latter which feeds the antenna 41. The lower end of waveguide 43*a* is provided with a coupling member 110 which carries a bearing 111 supporting a shell 112 to which the parabolic reflector 40 and the dummy reflector 44 are mechanically coupled. The reflectors 40 and 44 are substantially identical to the similar elements previously described for use in the preferred form; and they are rigidly connected to a coupling member 113 which is pivotally attached to and cooperates with the coupling member 110. Bearing 111 permits rotation of the shell 112 about a horizontal axis parallel to the axis of the lower end of the waveguide 43*a*; and the coupling 113, together with the parabolic surfaces, is pivotally attached to the shell 112 for rotation about a horizontal axis perpendicular to the axis of rotation of bearing 111. This pivotal connection is shown at 114 in Fig. 12, where it is seen to be located at the center of parabolic reflector 40, and to intersect the axis of rotation of bearing 111 so that the parabolic surfaces are free to rotate about two mutually perpendicular horizontal axes. Coupling members 110 and 113 may be of any suitable form known in the art, and while the form shown is very satisfactory, any of the other suitable forms may be used.

Connected to the coupling member 113 is a waveguide 43*b* which corresponds to the lower end of waveguide 43 of the preferred form, and which is coupled to an antenna dipole 41 similar to that previously described. A reflector dipole 42 is spaced outwardly the proper distance from antenna 41, and a block 67 is mounted on waveguide 43*b* to support an independent dipole 62. All of these components function in the manner previously described, though there is a slight loss of efficiency when waveguide 43*b* is rotated about pivot point 114 or about the axis of bearing 111. This decrease, however, is not sufficient ot interfere with the successful operation of the equipment or to affect its usefulness.

To maintain the parabolic reflector 40 and the equipment carried thereby in a position for rotation about a vertical axis at all times, I suspend a flywheel 115 from a motor 116 which is carried by the parabolic members 40 and 44. The axis of rotation of the flywheel 115 and motor 116 is aligned with the intersection of the horizontal axes of rotation of the parabolic members 40 and 44. In this way flywheel 115 and motor 116 cooperate to form a gyroscope having three degrees of freedom; and by balancing the entire assembly so that it is slightly pendulous, a self-erecting gyro-stabilized system is provided. If the rotating system is greatly unbalanced so that it is strongly pendulous, lateral and longitudinal acceleration will tend to cause precession of the gyroscope; but if the assembly is made only slightly pendulous, the precessing forces will be reduced to a minimum while there will still be a sufficient force to erect the system to vertical. Power for the motor 116 is provided through slip rings and brushes 117 and 118 respectively, mounted on the waveguide 38 above the platform 31.

Since platform 31 is not gyro-stabilized while independent dipole 62 is, it will be apparent that it is not practical to control the position of the independent dipole by a mechanical linkage connected to an operating device mounted on the platform 31. Furthermore, should such a linkage be developed which could be used regardless of the angle of deviation between the platform 31 and the waveguide section 43b, any movement of that linkage would tend to cause a force to act upon the parabolic reflector 40 and thus cause the gyroscope to precess. Consequently, in this optional form I have provided an operating mechanism which is mounted on the rotating elements and electrically connected in a suitable manner to a control device mounted on platform 31. While various mechanisms may be used, I have shown an operating device which includes a solenoid 120 mounted on the dummy reflector 44 and adapted to attract an armature 121 which is connected by a rod 122 to the independent dipole 62. The forward end of rod 122 is supported by the block 67, and a spring 73 urges the dipole 62 to one of its limiting positions. When solenoid 120 is energized, however, armature 121 is attracted thereto, to rotate rod 122 and turn independent dipole 62 to its other limiting position. As indicated, armature 121 and rod 122 may be provided with offsets and otherwise formed to avoid all possible interference with bearing shell 112 or other members movable with respect to the gyro-stabilized assembly. Electrical connection to solenoid 120 may be established by means of slip rings and brushes 123 and 124 respectively, mounted on waveguide 38 above the platform 31. Manually operated switches may be provided to control the operation of solenoid 120 independently of the cam-operated switch to provide for continuous scanning by the pencil or the cosecant-squared beam as desired. Waveguide 38 is rotated by a motor in a manner similar to that of the previously described form, and connections to the indicator by both electrical cable and flexible shaft are as previously described.

*Operation of Fig. 12*

The operation of my optional form is similar in many respects to that of the preferred form previously described, with various exceptions noted below. During the warm up period of the optional form, it is not necessary to rotate the waveguide 38 by energizing motor 46, but motor 116 should be energized so that gyroscopic flywheel 115 is brought up to speed to provide the necessary rigidity. During this initial warm up period, the transmitter and receiver components should be placed in standby condition, and when the craft is airborne, they may be placed in operating condition. At the same time, the motor driving waveguide 38 is energized, and the equipment then begins its scanning.

Assuming at first that the aircraft is flying so that the axis of the waveguide 38 is vertical, the rotation of the waveguide carries parabolic reflector 40 with it so that the beam emitted by antenna 41 provides a true horizontal sweep. If this is done with independent dipole 62 in a position parallel to antenna dipole 41, the sweep will be by a beam having a cosecant-squared pattern, as previously described. Assuming that solenoid 120 is energized under these conditions, when the first sweep has been completed, the cam and follower driven by the same gear train which drives waveguide 38 will operate the switch controlling the energization of the solenoid to de-energize the latter and permit spring 73 to move independent dipole 62 to a position perpendicular to the antenna dipole 41. When this is done, the beam emitted by the device is of the relatively narrow pencil variety used in obstacle detection. This sequential scanning by a cosecant-squared beam and then a pencil beam produces the same results on the screen of the indicator 23 as secured by the previously described form.

Should the aircraft move about its roll axis, as it would when banking to make a turn, the platform 31 would be tilted and there will thus be movement of the reflector assembly about the pivot point 114, and about the axis of bearing 111. The gyroscopic action of flywheel 115 will tend to maintain the plane of rotation of the parabolic reflector 40 horizontal, it being understood that the degree of pendulousness is relatively slight and hence will not cause the gyroscope to erect to a false vertical caused by the lateral accelerational forces of the turn unless the latter is continued for an excessive length of time. Should the aircraft move about its pitch axis, a similar movement of parabolic reflector 40 about pivot point 114 and about the axis of bearing 111 would result, as would a combination of movements about both the roll and pitch axes.

Since the parabolic surfaces 40 and 44 are mounted for pivotal movement about perpendicular horizontal axes passing through their centers, and since the intersection of these axes is at the center of the spherical portion of the radome 22, these members are capable of unlimited movement above these axes without touching the radome. This movement, however, is limited by the touching or interference of the parabolic members with the waveguides 38 or 43*a*, or with the platform 31. In addition, with the form of pivotal coupling shown, including coupling members 110 and 113, the efficiency of transmission of waves between waveguides 43*a* and 43*b* is seriously impaired when the angles become too great. However, there is usually mechanical interference between some of the relatively movable members before the critical angle of the coupling is reached. With my previously described form, platform 31 and all members supported thereby rotate about a point determined by the intersection of the axes of bearings 32 and 34 which is considerably above the center of the spherical portion of the radome 22. Consequently, there will be interference between the parabolic surfaces 40 and 44, and the radome 22 with a relatively small angular deviation.

When the requirements are such that a large radome may be used, the first described form is preferable, since the efficiency of the waveguide used therein is higher. However, when the need for a small radome outweighs the requirement for high efficiency, the form shown in Fig. 12 will generally be used. Both forms represent a definite advance iin the art, and the choice between them is made on the basis of the requirements mentioned. While other methods have been used, some of them being very elaborate and costly, the use of sequential scanning provides a very simple and accurate method of indicating the features of the terrain, and indicating with special clarity any obstacles with which the aircraft might collide.

In common with other aircraft equipment intended to be used at high altitudes, it may be desirable to maintain the air within the housing 21 and radome 22 under pressure. Such a procedure is particularly desirable in cases where high voltage electrical equipment is operated, since reduced pressure causes a reduction in the dielectric strength of air, and arcing and flash-over may result. Consequently, I have designed the housing 21 and radome 22 so that the interior thereof may be "pressurized" either by continuously forcing dry air therein, or by filling the device with air under pressure and then sealing it.

Where auxiliary pressurizing equipment is not available or where it is considered impractical to maintain the entire housing 21 and radome 22 under pressure, the form of device shown in Figs. 13, 14 and 15 may be used with considerable advantage. In Fig. 13, the housing 21 and the radome 22 are omitted for the sake of clarity, and it will be seen that the platform 31 is supported by gimbals 33 as in the previously described forms. The transmitter, receiver, and the other high frequency components previously designated generally by the numeral 36 are the same as in the other forms, and a waveguide 37 (not shown in Fig. 13) is connected to a rotating waveguide 38 which in turn connects to another waveguide 43. At its forward end, the waveguide 43 is provided with a dipole reflector 62 operated by a cord 66 as in my first described form, and the mechanism for controlling the movement of the cord is substantially identical with that previously described. While an antenna array similar to that shown in Fig. 7 may be used with certain modifications, I prefer to use a slightly different type of antenna feed 130 which is commercially available and is known as a "pressurized antenna feed." An end view of this device is shown in Fig. 15, but since it, in and of itself, forms no part of my invention, it is not further described here.

To provide the necessary pressure tight chamber for the high frequency components of my navigational device, an interior housing 131 is mounted on the platform 31 to enclose the various components previously mentioned and the stabilizing gyroscope so that a pressurized chamber is provided for the operating elements of my device. The joints and connections which extend through the platform 31 and the interior housing 131 are provided with seals so that there will be no substantial escape of air therethrough, and the use of the pressurized antenna feed 130 prevents the escape of air through the waveguides 38 and 43.

To provide the supply of air under pressure for use in this form of my device, I employ a gyroscope rotor 132 of slightly modified form. As indicated in the drawing, the rotor 132 is located within the interior housing 131 near the top thereof, and is provided with a series of radially extending grooves 133 on its upper surface to act as vanes of a centrifugal blower. The rotor 132 is provided with a gear 51 which meshes with a pinion 52 driven by a shaft 59 connected to the motor 46 (not shown in Fig. 13), all as in my previously described forms, and the rotor therefore revolves at a high rate of speed. Air is supplied to the center of the rotor 132 through a dehydrator unit 134 of any suitable type mounted on the top of the interior housing 131, and a check valve 135, shown in Fig. 14, is preferably inserted in the connection between the dehydrator and the interior of the housing. Dry air is thus drawn into the interior housing 131 when the rotor 132 is driven at its normal speed, and this air is discharged from the periphery of the rotor and passes through necessary apertures 136 into the pressurized chamber to replace any air which has been lost from the latter by leakage.

It will be apparent that when using the equipment just described, the use of the magnetic erecting means shown in my first described form is rendered difficult. As a result, I have found it desirable to mount an upwardly extending spindle 137 on the interior housing 131 and to provide a caging mechanism 138 mounted on support 139 to engage the spindle and cage the gyroscope in any suitable manner when this is desirable. Many different forms of caging mechanisms are known, and any suitable type may be used.

In addition to the pressurizing equipment which I have shown in Fig. 13, I have also illustrated a mounting for the parabolic reflector 40*a* and dummy reflector 44*a* which permits the pilot to control the vertical position of the beam as it sweeps in azimuth. While such a control is often unnecessary, it is sometimes advisable for the pilot to be provided with equipment which will permit him to determine the height of an obstacle which is indicated on the viewing screen. An example of a case where such a control is useful will be found where a storm is indicated on the viewing screen at a distance of several miles ahead of the plane and at substantially the same altitude. By elevating or depressing the beam, the pilot may determine the vertical extent of the storm and decide whether it is advisable to fly over, under, or around it. The device may be used in a similar manner to determine the elevation of a mountain peak when flying over unfamiliar territory, and to determine the elevation of aircraft and other obstacles with greater accuracy.

To secure these advantages I mount a yoke 140 on the waveguide 38 for rotation therewith, the yoke having a generally semi-circular shape with bearing members 141 at its lower end to support the reflector assembly comprising the parabolic reflector 40*a* and the dummy reflector 44*a*. The bearings 141 thus define a horizontal axis passing through the axis of the reflector 40*a* and perpendicular thereto so that the reflector may be tipped upwardly or downwardly to change the direction of the beam emitted therefrom. In accordance with well known laws of optics which high frequency radiation of this type follows, a given angular displacement of the reflector 40*a* causes an angular deflection of the beam emitted therefrom of twice that amount. Consequently, if the reflector assembly is tipped upwardly three and one-half degrees, the beam is moved upwardly seven degrees. It is to be understood that the waveguide 43 and the pressurized antenna feed 130 remain fixed in a vertical plane as the reflector assembly is tilted, though both the waveguide and the reflector assembly rotate in unison about the vertical axis provided by the waveguide 38. The reflector assembly is provided with cutout portions adapted to permit this pivotal movement of the assembly without the latter's striking or interfering with the waveguide 43 or other supporting elements.

To rotate the reflector assembly about its bearings 141, I provide a flexible shaft (not shown), similar to the flexible shaft 24, which may be connected to a control wheel on the indicator housing for operation by the pilot at any time. The opposite end of the flexible shaft is connected to a vertical shaft 142 which has a lead screw 143 carrying a traveler nut 144. A pivoted arm 145 is connected to the traveler nut 144 to operate a sliding collar 146 on waveguide 38 somewhat similar to the sliding collar 65 used to control the operation of the cord 66. A cord 147 extends downwardly from the collar 146 to a pulley 148 on the yoke 140, and then outwardly to the dummy reflector 44*a*. A spring 150 is connected to the yoke 140 and to the parabolic reflector 40*a* to urge the dummy reflector away from the pulley 148 to keep the cord 147 taut at all times. By rotating the hand wheel at the indicator device, however, the shaft 142 is turned to move the traveler nut 144 upwardly or downwardly and thus move the collar 146 in the opposite direction. Downward movement of the collar 146 tends to loosen the cord 147 so that spring 150 may tip the reflector 40*a* upwardly to raise the beam. Similarly, downward movement of the traveler nut 144 will raise the collar 146 upwardly to force the reflector 40a downwardly against the urging of the spring 150. The control wheel may be provided with calibrations which indicate the direction of the emitted beam with respect to the horizontal so that the pilot will have a clear indication before him at all times as to the particular area being scanned by this device.

*Operation of Figure 13*

In the operation of the form of my device shown in Fig. 13 the transmitter and receiver are placed in standby condition until the elements reach their normal operating conditions, and the gyroscope is caged to erect it quickly to a vertical position. The motor 46 is then started and the rotor 132 starts revolving to provide the desired gyroscopic stability and to force air into the interior housing 131. At sea level this will result in a pressure somewhat above normal atmospheric pressure within the interior housing 131, but this will cause no ill effects. When it is then desired to scan the terrain, the transmitter and receiver are placed in operating condition and a series of pulses are emitted to provide both the obstacle detection and the terrain indication previously described. Normally, the reflector 40a will be located so that its axis is horizontal and the usual operation results. However, if something is indicated, such as a storm whose upper and lower boundaries are unknown, the pilot may operate the control wheel to tilt the reflector 40a upwardly until the indication of the storm on the indicator screen is no longer present. By then reading the angle of the emitted beam from the indicator of the control wheel, the pilot will know at what rate he should climb in order to fly over the storm. He may then set the plane upon this course, return the reflector 40a to its normal horizontal position, and when he is above the storm, the latter will disappear from the indicator screen. Because of the gyroscopic stabilization of the reflector 40a there would be no benefit to be derived from merely pointing the nose of the plane upwardly in an attempt to secure the results had by tipping the reflector itself. For this reason, if the beam is to be tipped upwardly or downwardly at the will of the pilot, means similar to those described must be provided to tilt the reflector 40a.

It will be apparent that pressurizing equipment may be provided for my preferred form of Figs. 4–9, and similarly, the reflector 40 and the dummy reflector 44 in that form may be pivotally mounted as in the form shown in Fig. 13 to provide the control of the beam in elevation as just described. The form shown in Fig. 12, however, does not lend itself so readily to pressurizing because of the coupling members 110 and 113 between the waveguides 43a and 43b. Similarly, since the reflector assembly comprising the parabolic reflector 40 and the dummy reflector 44 are directly stabilized by the gyroscope rotor 115, tilting of the reflector assembly is not so easily accomplished.

While the devices have been shown as mounted in a radome 22 which extends beneath the lower surface of the craft, it is possible to mount them in other locations such as in the nose of the aircraft if the "blind spot" caused by the reflection of the radiant energy from the aircraft itself is not objectionable.

It should be noted that the movable member 95 may be attached to parabolic reflector 40 as shown in Figs. 10 and 11, to change the wave pattern of the device shown in Fig. 12 instead of using the independent dipole 62. Since this is such an obvious change, it is not believed that a complete description thereof is warranted.

It is to be understood, of course, that other changes and modifications may be made in this device, of which the examples just mentioned are illustrations. Consequently, while I have shown and described preferred and optional forms of my device, I do not wish to be limited to the particular form or arrangement of parts herein described and shown, except as covered by my claims.

I claim:

1. A navigational device comprising means to transmit radiant energy and to receive reflections thereof from remote objects, means to form said transmitted energy into a relatively small pencil beam, means to broaden said beam in one dimension, means to sweep said beam across an area to scan said area for said objects, and means synchronized with said sweep means to cause said beam forming and broadening means to be selectively operative, whereby said area is selectively scanned by said pencil beam or by said broader beam.

2. A navigational device comprising means to transmit radiant energy and to receive reflections thereof from remote objects, means to form said transmitted energy into a relatively sharp beam, means to broaden said beam in one dimension, means to rotate said beam about an axis to cause it to sweep across an area to scan said area for said objects, and means synchronized with rotation of said beam for controlling the operation of said beam broadening means to cause said area to be scanned by said sharp beam and by said broader beam in a predetermined alternating sequence.

3. A navigational device comprising a common antenna to transmit radiant energy and to receive reflections thereof from remote objects, said antenna comprising means to form said transmitted energy into a relatively small pencil beam, means to broaden said beam in one dimension, means to rotate said beam about a given axis to cause it to sweep across an area to scan said area for said objects, means synchronized with rotation of said beam for controlling the operation of said beam broadening means to cause said area to be scanned by said pencil beam and by said broader beam in a predetermined alternating sequence.

4. A navigational device comprising means to transmit radiant energy and to receive reflections thereof from from remote objects, focusing means to form said transmitted energy into a relatively sharp beam, means to modify the action of said focusing means to broaden said beam in one dimension transversely of the beam axis, means to rotate said beam about a second axis to cause it to sweep across an area to scan said area for said objects, and means synchronized with rotation of said beam for controlling the operation of said modifying means to cause said area to be scanned by said sharp beam and by said broader beam in a predetermined alternating sequence.

5. A navigational device for aircraft comprising means carried by said craft to transmit radiant energy and to receive reflections thereof from remote objects, focusing means to form said transmitted energy into a relatively narrow pencil beam, means to rotate said beam about an axis at an angle to the beam axis, means selectively to modify the action of said focusing means to form a relatively flat, fan beam lying in a plane through said two axes, means carried by said craft to indicate reflections received from remote reflecting objects within said beam upon a viewing screen, and means synchronized with rotation of said beam for controlling the operation of said modifying means to cause said pencil beam and said fan beam to be produced in a predetermined alternating sequence as said beam rotates.

6. A navigational device for an aircraft comprising means carried by said craft to transmit radiant energy and to receive reflections thereof from remote objects, focusing means to form said transmitted energy into a relatively sharp, horizontal beam, means selectively to modify the action of said focusing means to broaden said beam in a downward direction to form a relatively flat, vertical fan beam, driving means to rotate said beam about a vertical axis, gyro-vertical means connected to said focusing means to maintain said axis of rotation thereof vertical independently of the attitude of said aircraft within predetermined limits, means carried by said craft to indicate reflections from remote objects within said beam on a viewing screen, whereby reflections from said sharp beam indicate the presence of reflecting obstacles only at substantially the same altitude as said aircraft while reflections from said fan beam indicate features of reflecting objects at lower elevations and features of the terrain beneath said aircraft, and means for rotating said beam and for controlling the operation of said modifying means in synchronism with rotation of said beam to cause said sharp beam and said fan beam to be rotated in a predetermined alternating sequence, the reflections of objects within both of said beams being transmitted to said indicator so that the indications of said obstacles are effectively superimposed on the indications of said features.

7. A navigational device comprising a pulse transmitter for producing a series of pulses of high frequency energy, an antenna coupled to said transmitter for radiating said energy, focusing means cooperating with said antenna for concentrating said energy in a relatively narrow, pencil beam, means to rotate said antenna and focusing means about an axis at an angle to the beam axis, auxiliary means cooperating with said focusing means and selectively operative to broaden said beam into a relatively flat, fan beam lying in a plane through said two axes, a pulse receiver coupled to said antenna for detecting echoes of said pulses from remote reflecting objects scanned by said beam, indicating means controlled by said receiver and said rotating means for producing visual indications of the angular positions and distances of said objects with respect to said antenna and focusing means, and means actuated in synchronism with said rotation to render said auxiliary means alternately operative and inoperative in a predetermined sequence.

8. A navigational device for an aircraft comprising a high frequency radio transmitter carried by said craft for producing a pulse-modulated signal, an antenna coupled to said transmitter for radiating said signal, means including a reflector cooperating with said antenna for focusing said radiated signal into a relatively sharp, horizontal beam, means for varying the orientation of said antenna and said focusing means in azimuth about a vertical axis, a radio receiver coupled to said antenna for detecting echoes of said pulses reflected by remote objects in the path of said beam, a second antenna cooperating with said reflector and normally polarized in a direction to avoid affecting said sharp beam radiation, means selectively operative to broaden said beam vertically into a relatively flat, fan beam comprising means for altering the polarization of said second antenna, an indicator connected to said receiver and synchronized with the varying of orientation of said antenna to indicate the azimuth directions and distances of objects causing said echoes, means synchronized with the varying of orientation of said antenna to control the operation of said auxiliary means so that said sharp beam and said broader beam scan alternately in a predetermined sequence.

9. A navigational device for an aircraft comprising, a high frequency radio transmitter producing a pulse-modulated signal, an antenna coupled to said transmitter for radiating said signal, a reflector for focusing said radiated signal into a relatively narrow horizontal pencil beam, a motor for rotating said antenna and said reflector about a vertical axis to cause said beam to scan in azimuth, a radio receiver coupled to said antenna for detecting echoes of said pulses reflected by remote objects in the path of said beam, auxiliary focusing means cooperating with said reflector and selectively operative to broaden said beam in a downward direction to form a relatively flat, vertical fan beam, an electronic visual indicator connected to said receiver and controlled by said motor, said indicator having a fluorescent screen and producing thereon indications of the azimuth directions and distances of objects causing said echoes, and cam means operated by said motor for selectively operating said auxiliary means to cause said pencil beam and said fan beam to scan alternately in a predetermined sequence, said indications corresponding only to reflecting objects at substantially the same elevation as said aircraft during scanning of said pencil beam and corresponding to objects at lower elevations during scanning of said fan beam, the persistence of said fluorescent screen being sufficiently long to cause indications, corresponding to reflections from an object located in the overlap of said pencil and fan beams, to be superimposed and therefore appear more intense than reflections located outside said overlap.

10. A navigational device for an aircraft comprising means carried by said craft to transmit radiant energy and to receive reflections thereof from remote objects, focusing means to form said transmitted energy into a relatively narrow horizontal beam, modifying means selectively operable to broaden said beam in a downward direction to form a relatively flat, vertical fan beam, driving means to rotate said beam about a vertical axis, cam means operated by said driving means for actuating said modifying means to cause said narrow beam and said fan beam to be rotated in a predetermined sequence, manual control means selectively operable to provide said sequential scanning by said narrow and said fan beams or scanning by said pencil beam alone or scanning by said broader beam alone, an indicator connected to said first-mentioned means and responsive to said reflections to indicate on a viewing screen the location of objects causing said reflections, the reflections due to said narrow beam indicating reflecting obstacles only at substantially the same altitude as said aircraft, the reflections due to said broader beam indicating reflecting objects at lower elevations and on the terrain beneath said aircraft, the objects detected by both said beams appearing in superimposed relationship on said screen.

11. A navigational device for an aircraft comprising means carried by said craft to transmit radiant energy and to receive reflections thereof from remote objects, focusing means for forming said transmitted energy into a relatively narrow pencil beam, motor means for rotating said focusing means and said beam about a vertical axis at an angle thereto, auxiliary focusing means for selectively broadening said beam in a downward direction to form a relatively flat, vertical fan beam, cam means operated by said motor means for actuating said auxiliary focusing means to cause said pencil beam and said fan beam to be rotated in a predetermined sequence, manual control means selectively operable to provide said sequential scanning by said pencil and said broader beams or scanning by said pencil beam alone or scanning by said broader beam alone, an indicator connected to said first-mentioned means and responsive to said reflections to indicate on a viewing screen the locations of objects causing said reflections, the reflections due to said pencil beam indicating obstacles only at substantially said angle with respect to the vertical axis, and the reflections due to said fan beam indicating reflecting objects at smaller angles and on the terrain beneath said aircraft, the objects detected by both said beams appearing in superimposed relationship on said screen.

12. A navigational device comprising means to transmit radiant energy and to receive reflections thereof from remote objects, means to form said transmitted energy into a relatively small pencil beam, means to broaden said beam in one dimension, means to sweep said beam across an area to scan said area for said objects, means synchronized with said sweep means to cause a sequential scanning by said pencil beam and said broader beam in a predetermined alternating order, and manually controlled means selectively operable to provide scanning by said pencil beam alone or by said broader beam alone or by both said beams in said sequence.

13. A navigational device for an aircraft comprising means carried by said craft to transmit radiant energy and to receive reflections thereof from remote objects, focusing means to form said transmitted energy into a relatively sharp, narrow, pencil beam, means to rotate said beam about an axis at an angle to the beam axis, means selectively to modify the action of said focusing means to broaden said beam in a plane through said axes to form a relatively flat, fan beam, means carried by said craft to indicate reflections received from remote reflecting objects within said beam upon a viewing screen, whereby reflections from said pencil beam indicate the presence of obstacles only at substantially said angle with respect to said axis of rotation and the reflections due to said fan beam indicate reflecting objects over a range of angles, means for rotating said beam and for controlling the operation of said modifying means in synchronism with rotation of said beam to cause said pencil beam and said fan beam to be rotated in a predetermined alternating sequence, the reflections of both of said beams then being transmitted to said indicator so that the indications of said objects are effectively superimposed on said screen, and manually controlled means selectively operable to provide scanning by both said fan beam and said pencil beam in sequence or by said pencil beam alone or by said broader beam alone.

14. A navigational device comprising means to transmit radiant energy and to receive reflections thereof from remote objects, focusing means to form said transmitted energy into a relatively sharp, narrow, pencil beam, means to rotate said beam in azimuth to cause it to scan an area, means to modify the action of said focusing means to broaden said beam in a direction transverse relative to the beam axis, means synchronized with rotation of said beam for operating said modifying means during alternate rotations of said beam to effect scanning by said narrow beam and the broadened beam in alternation, indicating means for displaying received reflections occurring in the overlap of said pencil and broadened beam in superimposed manner, and means for insuring a proper superimposition of said last-named reflections comprising gyroscopic means for maintaining the axis of rotation of said focusing means vertical during said pencil and broadened beam operation.

15. In combination, an antenna having a directive reception pattern for receiving radiant energy from objects located in a given area, means for sequentially sweeping said pattern over said given area, means synchronized with said sweeping of said pattern for decreasing the directivity of said pattern to sweep a larger area including at least a portion of said given area during alternate sweeps thereof, and an indicator coupled to said antenna for displaying energy received during each sequential sweep of said pattern to provide an indication of an object disposed within said portion of said given area in a superposed manner.

16. In combination, an electromagnetic waveguide, a directive antenna and associated reflector suspended from one end of said waveguide in wave transfer relationship, means for rotating said waveguide reflector and antenna about a first axis, said antenna and reflector being mounted for angular displacement about two mutually perpendicular axes which are normal to said first axis, and means supported from said waveguide for gyroscopically stabilizing said antenna and reflector about said first axis.

17. The combination of a platform for use on an aircraft, gimbal supports for said platform, radar apparatus mounted on said plateform, a wave guide extending from said apparatus through said platform a directional antenna disposed below said platform and supported by said wave guide in wave transfer relationship therewith, means on said platform to rotate said wave guide and antenna to scan an area about said craft, and gyroscopic means to stabilize said platform and antenna to maintain a substantially fixed relation between said area and said craft during movement.

18. In combination, an electromagnetic waveguide, a directive antenna suspended from one end of said waveguide in wave transfer relationship, means for rotating said waveguide and antenna about a first axis, said antenna being mounted for angular displacement relative to said waveguide about two mutually perpendicular axes which are normal to said first axis, and means rigidly supported by said antenna for gyroscopically stabilizing said antenna about said first axis.

19. In combination, an electromagnetic waveguide, a directive antenna and associated reflector suspended from one end of said waveguide in wave transfer relationship, means for rotating said waveguide, antenna and reflector about a first axis, said antenna and reflector being mounted for angular displacement relative to said waveguide about two mutually perpendicular axes which are normal to said first axis, a flywheel supported by said reflector, means for rotating said flywheel about an axis to gyroscopically stabilize said antenna and reflector about a vertical axis.

DONALD K. ALLISON.

REFERENCES CITED

The following references are of record in the file of this patent:

UNITED STATES PATENTS

| Number | Name | Date |
|---|---|---|
| 2,223,224 | Newhouse | Nov. 26, 1940 |
| 2,396,112 | Morgan | Mar. 5, 1946 |
| 2,401,337 | Curry | June 4, 1946 |
| 2,407,275 | Hays | Sept. 10, 1946 |
| 2,408,373 | Chu | Oct. 1, 1946 |
| 2,408,848 | Hammond | Oct. 8, 1946 |
| 2,410,666 | Leck | Nov. 5, 1946 |
| 2,415,094 | Hansen et al. | Feb. 4, 1947 |
| 2,417,052 | Benioff | Mar. 11, 1947 |
| 2,419,567 | Labin | Apr. 29, 1947 |
| 2,421,747 | Engelhardt | June 10, 1947 |
| 2,426,189 | Espenschied | Aug. 26, 1947 |
| 2,426,658 | Wooldridge | Sept. 2, 1947 |
| 2,452,349 | Becker | Oct. 26, 1948 |
| 2,472,824 | Hays | June 14, 1949 |
| 2,512,139 | Cady | June 20, 1950 |
| 2,512,147 | Gardner | June 20, 1950 |
| 2,521,732 | Kline | Sept. 12, 1950 |
| 2,526,314 | Alexanderson et al. | Oct. 17, 1950 |
| 2,544,648 | Bergey et al. | Mar. 13, 1951 |
| 2,554,119 | Perham | May 22, 1951 |